United States Patent
Jin et al.

(10) Patent No.: US 9,635,591 B2
(45) Date of Patent: Apr. 25, 2017

(54) WIRELESS COMMUNICATION METHOD AND WIRELESS TERMINAL

(71) Applicant: Huawei Device Co., Ltd., Shenzhen (CN)

(72) Inventors: Hui Jin, Beijing (CN); Xiaoyan Duan, Beijing (CN); Li Shen, Beijing (CN); Peng Wang, Beijing (CN); Guoqiong Cao, Beijing (CN); Songping Yao, Beijing (CN); Hao Song, Beijing (CN); Bo Zhang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/984,811

(22) Filed: Dec. 30, 2015

(65) Prior Publication Data

US 2016/0119824 A1    Apr. 28, 2016

Related U.S. Application Data (63) Continuation of application No. PCT/CN2014/076278, filed on Apr. 25, 2014, which
(Continued)

(51) Int. Cl.
*H04W 36/00* (2009.01)
*H04W 8/24* (2009.01)
(Continued)

(52) U.S. Cl.
CPC ......... *H04W 36/0022* (2013.01); *H04W 8/24* (2013.01); *H04W 36/0016* (2013.01);
(Continued)

(58) Field of Classification Search
USPC ...................................................... 455/436
See application file for complete search history.

(56) References Cited

U.S. PATENT DOCUMENTS

2013/0188499 A1* 7/2013 Mach .................... H04W 48/20
                                                                   370/252
2013/0235814 A1   9/2013 Wietfeldt et al.
(Continued)

FOREIGN PATENT DOCUMENTS

| CN | 102301759 A | 12/2011 |
|---|---|---|
| CN | 103517363 A | 1/2014 |
| CN | 103535071 A | 1/2014 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.1.0, Technical Specification, Mar. 2014, 356 pages.
(Continued)

*Primary Examiner* — Joel Ajayi
(74) *Attorney, Agent, or Firm* — Conley Rose, P.C.

(57) ABSTRACT

A wireless communications component that supports a first radio access technology (RAT) and a second RAT. After the wireless communications component establishes a connection with a second RAT network, the wireless communications component receives a first message sent by the second RAT network. The first message includes content that is used to query a second RAT capability of the wireless communications component. The wireless communications component sends a second message to the second RAT network. The second message is used to indicate the second RAT capability of the wireless communications component and indicate that the wireless communications component does not support the first RAT. Because the wireless communications component reports to the second RAT network that the wireless communications component does not support the first RAT, the second RAT network does not instruct the (Continued)

wireless communications component to be changed to the first RAT.

18 Claims, 5 Drawing Sheets

Related U.S. Application Data is a continuation of application No. PCT/CN2014/074467, filed on Mar. 31, 2014.

(51) Int. Cl.
　　*H04W 36/16*　　(2009.01)
　　*H04W 60/00*　　(2009.01)
　　*H04W 88/06*　　(2009.01)
　　*H04W 84/04*　　(2009.01)

(52) U.S. Cl.
　　CPC ....... *H04W 36/165* (2013.01); *H04W 60/005* (2013.01); *H04W 84/042* (2013.01); *H04W 88/06* (2013.01)

(56) References Cited

U.S. PATENT DOCUMENTS

2013/0237223 A1* 9/2013 Hietalahti ............. H04W 48/18
　　　　　　　　　　　　　　　　　　455/435.1
2014/0235242 A1　　8/2014 Granzow et al.

OTHER PUBLICATIONS

Foreign Communication From a Counterpart Application, PCT Application No. PCT/CN2014/076278, English Translation of International Search Report dated Dec. 31, 2014, 2 pages.
Foreign Communication From a Counterpart Application, PCT Application No. PCT/CN2014/076278, Written Opinion dated Dec. 31, 2014, 4 pages.

* cited by examiner

WIRELESS COMMUNICATION METHOD AND WIRELESS TERMINAL

CROSS-REFERENCE TO RELATED APPLICATIONS

This application is a continuation of International Application No. PCT/CN2014/076278, filed on Apr. 25, 2014, which claims priority to International Application No. PCT/CN2014/074467, filed on Mar. 31, 2014, both of which are hereby incorporated by reference in their entireties.

TECHNICAL FIELD

Embodiments of the present disclosure relate to wireless communications technologies, and in particular, to a wireless communication method and a wireless terminal.

BACKGROUND

With development of network technologies, a fourth generation (4G) mobile communication technology has been widely applied. 4G may include multiple network standards, for example, Long Term Evolution (LTE)-Time Division Duplex (TDD) and LTE-Frequency Division Duplex (FDD).

A 4G network provides only a packet switched domain (PS domain) service, and cannot provide a circuit switched domain (CS domain) service. However, second generation (2G) and third generation (3G) networks support both the PS domain service and the CS domain service. Currently, a voice service and a short message service are mainly provided by a CS domain, and a data service is mainly provided by a PS domain. To support both the PS domain service and the CS domain service, a dual-standby technology is currently used when the 4G network is deployed. A wireless terminal that uses the dual-standby technology has two radio frequency modules, where one radio frequency module is a master radio frequency module mainly configured to provide a PS domain service, and the master radio frequency module provides support for a 4G network; and the other radio frequency module is a slave radio frequency module, and the slave radio frequency module is mainly configured to provide a CS domain service.

In a process in which the wireless terminal that uses the dual-standby technology performs a PS domain service, when there is a 4G signal, the wireless terminal works in a 4G network, and when the 4G signal is weak, the wireless terminal is changed to a 2G or 3G network. When the 4G signal recovers to normal, the wireless terminal is changed to the 4G network again. Currently, an inappropriate configuration of the 4G network causes frequent changes of the wireless terminal between 4G and 2G/3G, and results in heavy network load and poor user experience.

SUMMARY

Embodiments of the present disclosure provide a wireless communication method and a wireless terminal, which can reduce the number of changes of the wireless terminal between 4G and 2G/3G, reduce network load, and enhance user experience.

According to a first aspect, a wireless communication method is provided, where the method includes, after a wireless terminal that supports a first radio access technology (RAT) and a second RAT establishes a connection with a second RAT network, receiving, by the wireless terminal, a first message sent by the second RAT network, where the first message includes content that is used to query a second RAT capability of the wireless terminal; and sending, by the wireless terminal, a second message to the second RAT network, where the second message is used to indicate the second RAT capability of the wireless terminal and indicate that the wireless terminal does not support the first RAT.

With reference to the first aspect, in a first possible implementation manner of the first aspect, the sending, by the wireless terminal, a second message to the second RAT network specifically includes sending, by the wireless terminal, the second message to the second RAT network when the wireless terminal is in a dual-standby mode.

With reference to the first aspect, in a second possible implementation manner of the first aspect, the sending, by the wireless terminal, a second message to the second RAT network specifically includes sending, by the wireless terminal, the second message to the second RAT network when the wireless terminal is in a dual-standby mode; and sending, by the wireless terminal, a third message to the second RAT network when the wireless terminal is in a circuit switched fallback mode, where the third message is used to indicate the second RAT capability of the wireless terminal and indicate that the wireless terminal supports the first RAT.

With reference to the first or the second possible implementation manner of the first aspect, in a third possible implementation manner, the sending, by the wireless terminal, the second message to the second RAT network when the wireless terminal is in a dual-standby mode specifically includes sending, by the wireless terminal, the second message to the second RAT network when a public land mobile network (PLMN) identifier of a second RAT cell on which the wireless terminal camps is in an operator controlled PLMN selector list that is stored by the wireless terminal; and the sending, by the wireless terminal, a third message to the second RAT network when the wireless terminal is in a circuit switched fallback mode specifically includes sending, by the wireless terminal, the third message to the second RAT network when the PLMN identifier of the second RAT cell on which the wireless terminal camps is not in the operator controlled PLMN selector list that is stored by the wireless terminal.

With reference to the first aspect or any one of the foregoing possible implementation manners of the first aspect, in a fourth possible implementation manner, the second message includes the second RAT capability of the wireless terminal but does not include information related to the first RAT; or the second message includes the second RAT capability of the wireless terminal and includes an identifier that is used to indicate that the wireless terminal does not support the first RAT.

With reference to the fourth possible implementation manner of the first aspect, in a fifth possible implementation manner, the information related to the first RAT is frequency band information of the first RAT.

With reference to the first aspect or any one of the first to the third possible implementation manners of the first aspect, in a sixth possible implementation manner, the first message further includes content that is used to query a packet switched domain capability of the first RAT of the wireless terminal; or the first message further includes content that is used to query a first RAT capability of the wireless terminal.

With reference to the sixth possible implementation manner of the first aspect, in a seventh possible implementation manner, the second message includes the second RAT capability of the wireless terminal but does not include information related to the first RAT; or the second message includes the second RAT capability of the wireless terminal and includes an identifier that is used to indicate that the wireless terminal does not support the first RAT.

With reference to the seventh possible implementation manner of the first aspect, in an eighth possible implementation manner, when the first message further includes the content that is used to query the packet switched domain capability of the first RAT of the wireless terminal, the information related to the first RAT is frequency band information of the first RAT and information about the packet switched domain capability of the first RAT; or when the first message further includes the content that is used to query the first RAT capability of the wireless terminal, the information related to the first RAT is frequency band information of the first RAT and information about the first RAT capability.

With reference to the first aspect or any one of the foregoing possible implementation manners of the first aspect, in a ninth possible implementation manner, the method further includes, after the wireless terminal establishes the connection with the second RAT network, skipping detecting, by the wireless terminal, a signal strength corresponding to the first RAT.

With reference to the first aspect or any one of the foregoing possible implementation manners of the first aspect, in a tenth possible implementation manner, before the receiving, by the wireless terminal, a first message sent by the second RAT network, the method further includes re-establishing, by the wireless terminal, a connection with the second RAT network after the wireless terminal receives a fourth message that is sent by the second RAT network and carries a redirect indication, where the fourth message is used to instruct the wireless terminal to be redirected from the second RAT network to a first RAT network; and sending, by the wireless terminal, a fifth message to a second RAT network management entity, so that the second RAT network management entity triggers the second RAT network to send the first message to the wireless terminal.

With reference to the tenth possible implementation manner of the first aspect, in an eleventh possible implementation manner, the re-establishing, by the wireless terminal, a connection with the second RAT network after the wireless terminal receives a fourth message that is sent by the second RAT network and carries a redirect indication specifically includes re-establishing, by the wireless terminal, the connection with the second RAT network after the wireless terminal receives the fourth message that is sent by the second RAT network and carries the redirect indication, and when a signal strength that corresponds to the second RAT and is detected by the wireless terminal is higher than or equal to a first threshold.

With reference to the first aspect or any one of the foregoing possible implementation manners of the first aspect, in a twelfth possible implementation manner, the first RAT includes 2G and/or 3G, and the second RAT is 4G; and the connection established by the wireless terminal with the second RAT network is a radio resource control (RRC) connection.

According to a second aspect, a wireless terminal is provided, where the wireless terminal supports a first RAT and a second RAT, and the wireless terminal includes a wireless transceiver module and a processor, where the wireless transceiver module is configured to perform wireless communication externally; the processor is configured to, after the wireless terminal establishes a connection with a second RAT network, receive, using the wireless transceiver module, a first message sent by the second RAT network, where the first message includes content that is used to query a second RAT capability of the wireless terminal; and the processor is further configured to, after the first message is received, send a second message to the second RAT network using the wireless transceiver module, where the second message is used to indicate the second RAT capability of the wireless terminal and indicate that the wireless terminal does not support the first RAT.

In a first possible implementation manner of the second aspect, when sending the second message to the second RAT network using the wireless transceiver module, the processor is specifically configured to send the second message to the second RAT network using the wireless transceiver module when the wireless terminal is in a dual-standby mode.

With reference to the second aspect or the first possible implementation manner of the second aspect, in a second possible implementation manner, the second message includes the second RAT capability of the wireless terminal but does not include information related to the first RAT; or the second message includes the second RAT capability of the wireless terminal and includes an identifier that is used to indicate that the wireless terminal does not support the first RAT.

With reference to the second possible implementation manner of the second aspect, in a third possible implementation manner, the information related to the first RAT is frequency band information of the first RAT.

With reference to the second aspect or the first possible implementation manner of the second aspect, in a fourth possible implementation manner, the first message further includes content that is used to query a packet switched domain capability of the first RAT of the wireless terminal; or the first message further includes content that is used to query a first RAT capability of the wireless terminal.

With reference to the fourth possible implementation manner of the second aspect, in a fifth possible implementation manner, the second message includes the second RAT capability of the wireless terminal but does not include information related to the first RAT; or the second message includes the second RAT capability of the wireless terminal and includes an identifier that is used to indicate that the wireless terminal does not support the first RAT.

With reference to the fifth possible implementation manner of the second aspect, in a sixth possible implementation manner, when the first message further includes the content that is used to query the packet switched domain capability of the first RAT of the wireless terminal, the information related to the first RAT is frequency band information of the first RAT and packet switched domain capability information of the first RAT; or when the first message further includes the content that is used to query the first RAT capability of the wireless terminal, the information related to the first RAT is frequency band information of the first RAT and information about the first RAT capability.

With reference to the second aspect or any possible implementation manner of the second aspect, in a seventh possible implementation manner, the first RAT includes 2G and/or 3G, and the second RAT is 4G; and the connection established by the wireless terminal with the second RAT network is an RRC connection.

According to a third aspect, a wireless communication method is provided, where the method includes, after a wireless communications component that supports a first radio access technology RAT and a second RAT establishes a connection with a second RAT network, receiving, by the wireless communications component, a first message sent by the second RAT network, where the first message includes content that is used to query a second RAT capability of the wireless communications component; and sending, by the wireless communications component, a second message to the second RAT network, where the second message is used to indicate the second RAT capability of the wireless communications component and indicate that the wireless communications component does not support the first RAT.

In a first possible implementation manner of the third aspect, the sending, by the wireless communications component, a second message to the second RAT network specifically includes sending, by the wireless communications component, the second message to the second RAT network when the wireless communications component is in a dual-standby mode.

With reference to the third aspect or the first possible implementation manner of the third aspect, in a second possible implementation manner, the second message includes the second RAT capability of the wireless communications component but does not include information related to the first RAT; or the second message includes the second RAT capability of the wireless communications component and includes an identifier that is used to indicate that the wireless communications component does not support the first RAT.

With reference to the second possible implementation manner of the third aspect, in a third possible implementation manner, the information related to the first RAT is frequency band information of the first RAT.

With reference to the third aspect or the first possible implementation manner of the third aspect, in a fourth possible implementation manner, the first message further includes content that is used to query a packet switched domain capability of the first RAT of the wireless communications component; or the first message further includes content that is used to query a first RAT capability of the wireless communications component.

With reference to the fourth possible implementation manner of the third aspect, in a fifth possible implementation manner, the second message includes the second RAT capability of the wireless communications component but does not include information related to the first RAT; or the second message includes the second RAT capability of the wireless communications component and includes an identifier that is used to indicate that the wireless communications component does not support the first RAT.

With reference to the fifth possible implementation manner of the third aspect, in a sixth possible implementation manner, when the first message further includes the content that is used to query the packet switched domain capability of the first RAT of the wireless communications component, the information related to the first RAT is frequency band information of the first RAT and information about the packet switched domain capability of the first RAT; or when the first message further includes the content that is used to query the first RAT capability of the wireless communications component, the information related to the first RAT is frequency band information of the first RAT and information about the first RAT capability.

With reference to the third aspect or any possible implementation manner of the third aspect, in a seventh possible implementation manner, the first RAT includes 2G and/or 3G, and the second RAT is 4G; and the connection established by the wireless communications component with the second RAT network is an RRC connection.

According to a fourth aspect, a wireless communications component is provided, where the wireless communications component supports a first RAT and a second RAT, and the wireless communications component includes a receiving module configured to, after the wireless communications component establishes a connection with a second RAT network, receive a first message sent by the second RAT network, where the first message includes content that is used to query a second RAT capability of the wireless communications component; and a sending module configured to send a second message to the second RAT network, where the second message is used to indicate the second RAT capability of the wireless communications component and indicate that the wireless communications component does not support the first RAT.

With reference to the fourth aspect, in a first possible implementation manner of the fourth aspect, the sending module is specifically configured to send the second message to the second RAT network when the wireless communications component is in a dual-standby mode.

With reference to the fourth aspect, in a second possible implementation manner of the fourth aspect, the sending module is specifically configured to send the second message to the second RAT network when the wireless communications component is in a dual-standby mode; and send a third message to the second RAT network when the wireless communications component is in a circuit switched fallback mode, where the third message is used to indicate the second RAT capability of the wireless communications component and indicate that the wireless communications component supports the first RAT.

With reference to the first possible implementation manner of the fourth aspect, in a third possible implementation manner, the sending module is specifically configured to send the second message to the second RAT network when a public land mobile network (PLMN) identifier of a second RAT cell on which the wireless communications component camps is in an operator controlled PLMN selector list that is stored by the wireless communications component.

With reference to the fourth aspect or any one of the foregoing possible implementation manners of the fourth aspect, in a fourth possible implementation manner, the second message includes the second RAT capability of the wireless communications component but does not include information related to the first RAT; or the second message includes the second RAT capability of the wireless communications component and includes an identifier that is used to indicate that the wireless communications component does not support the first RAT.

With reference to the fourth possible implementation manner of the fourth aspect, in a fifth possible implementation manner, the information related to the first RAT is frequency band information of the first RAT.

With reference to the fourth aspect or any one of the first to the third possible implementation manners of the fourth aspect, in a sixth possible implementation manner, the first message further includes content that is used to query a packet switched domain capability of the first RAT of the wireless communications component; or the first message further includes content that is used to query a first RAT capability of the wireless communications component.

With reference to the sixth possible implementation manner of the fourth aspect, in a seventh possible implementation manner, the second message includes the second RAT capability of the wireless communications component but does not include information related to the first RAT; or the second message includes the second RAT capability of the wireless communications component and includes an identifier that is used to indicate that the wireless communications component does not support the first RAT.

With reference to the seventh possible implementation manner of the fourth aspect, in an eighth possible implementation manner, when the first message further includes the content that is used to query the packet switched domain capability of the first RAT of the wireless communications component, the information related to the first RAT is frequency band information of the first RAT and information about the packet switched domain capability of the first RAT; or when the first message further includes the content that is used to query the first RAT capability of the wireless communications component, the information related to the first RAT is frequency band information of the first RAT and information about the first RAT capability.

With reference to the fourth aspect or any one of the foregoing possible implementation manners of the fourth aspect, in a ninth possible implementation manner, the wireless communications component further includes a connecting module configured to re-establish a connection with the second RAT network before the receiving module receives the first message sent by the second RAT network and after the receiving module receives a fourth message that is sent by the second RAT network and carries a redirect indication, where the fourth message is used to instruct the wireless communications component to be redirected from the second RAT network to a first RAT network; where the sending module is further configured to send a fifth message to a second RAT network management entity after the connecting module re-establishes the connection with the second RAT network, so that the second RAT network management entity triggers the second RAT network to send the first message to the wireless communications component.

With reference to the ninth possible implementation manner of the fourth aspect, in a tenth possible implementation manner, the connecting module is specifically configured to re-establish the connection with the second RAT network before the receiving module receives the first message sent by the second RAT network, after the receiving module receives the fourth message that is sent by the second RAT network and carries the redirect indication, and when a signal strength that corresponds to the second RAT and is detected by the wireless communications component is higher than or equal to a first threshold.

With reference to the fourth aspect or any one of the foregoing possible implementation manners of the fourth aspect, in a twelfth possible implementation manner, the first RAT includes 2G and/or 3G, and the second RAT is 4G; and the connection established by the wireless communications component with the second RAT network is a RRC connection.

According to the embodiments of the present disclosure, after a wireless terminal that supports a first RAT and a second RAT establishes a connection with a second RAT network, the wireless terminal may receive a first message that is used to query a second RAT capability of the wireless terminal and is sent by the second RAT network; and the wireless terminal sends a second message to the second RAT network, where the second message is used to indicate the second RAT capability of the wireless terminal and indicate that the wireless terminal does not support the first RAT. Because the wireless terminal reports to the second RAT network that the wireless terminal does not support the first RAT, the second RAT network does not instruct the wireless terminal to be changed to the first RAT, so that the wireless terminal can work in the second RAT network for a long time, the number of changes of the wireless terminal between the first RAT and the second RAT is reduced, network load is reduced, and user experience is enhanced.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

When ordinal numbers such as "first" and "second" are mentioned in the embodiments of the present disclosure, it should be understood that they merely play a role of distinction unless they really express the meaning of a sequence according to the context.

A wireless terminal in the embodiments of the present disclosure supports at least a first RAT and a second RAT. RATs may be various radio access technologies, for example, Evolved Universal Terrestrial Radio Access (E-UTRA), Universal Terrestrial Radio Access (UTRA), GSM EDGE Radio Access Network (GERAN), or another radio access technology, where GSM is an acronym of the Global System for Mobile Communications and EDGE is an acronym of an enhanced data rate for GSM evolution technology.

In the embodiments of the present disclosure, the first RAT and the second RAT are different network standards. For example, the first RAT may be 2G (including 2G PS and 2G CS), may also be 3G, or may further be 2G and 3G; and the second RAT may be 4G, where 2G may be GERAN, 2G PS may be GERAN-PS, 2G CS may be GERAN-CS, 3G may be UTRA, and 4G may be E-UTRA. When 4G is E-UTRA (that is, the second RAT is E-UTRA), a 4G network is an Evolved Universal Terrestrial Radio Access Network (E-UTRAN) (that is, a second RAT network is an E-UTRAN). Certainly, the first RAT and the second RAT are not limited thereto.

A wireless terminal in the embodiments of the present disclosure, for example, may be a mobile phone, a tablet computer, a notebook computer, an ultra-mobile personal computer (UMPC), a netbook, or a personal digital assistant (PDA).

Figure 1:
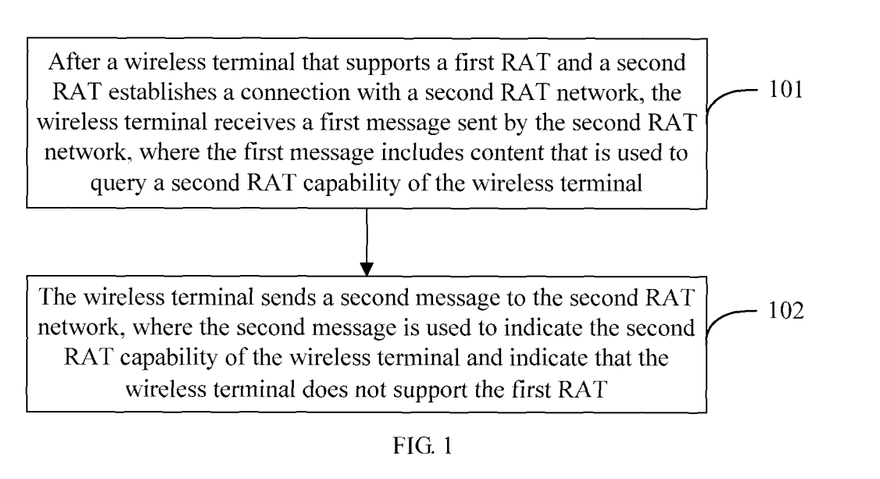
FIG. 1 is a schematic flowchart of a wireless communication method according to a first embodiment of the present disclosure.

FIG. 1 is a schematic flowchart of a wireless communication method according to a first embodiment of the present disclosure. As shown in FIG. 1, the method includes the following steps:

Step 101: After a wireless terminal that supports a first RAT and a second RAT establishes a connection with a second RAT network, the wireless terminal receives a first message sent by the second RAT network, where the first message includes content that is used to query a second RAT capability of the wireless terminal.

Figure 2:
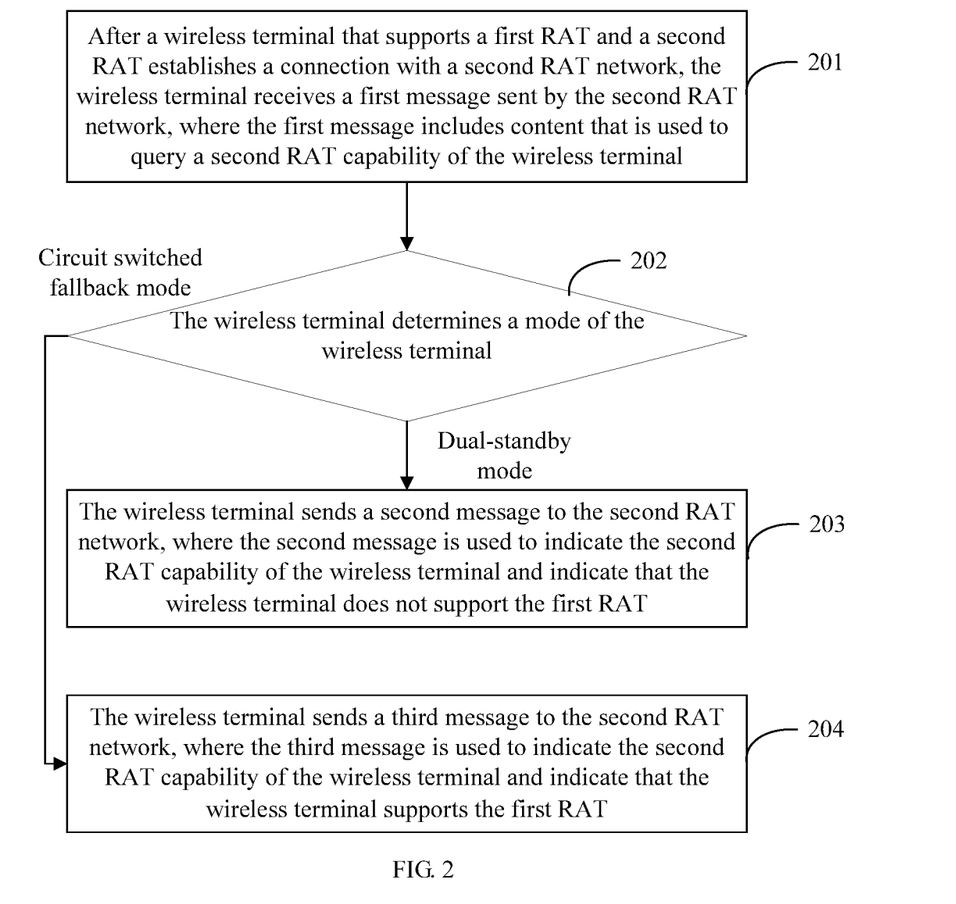
FIG. 2 is a schematic flowchart of a wireless communication method according to a second embodiment of the present disclosure.

Specifically, in embodiments shown in FIG. 1 and FIG. 2, the first RAT, for example, may be 2G, that is, a GERAN; or the first RAT, for example, may be 3G, that is, UTRA; or the first RAT, for example, may be 2G and 3G.

After the wireless terminal establishes the connection with the second RAT network, the second RAT network may send the first message to the wireless terminal. When the second RAT is 4G, the connection established by the wireless terminal with the second RAT network is a radio resource control (RRC) connection. The RRC connection is a signaling connection between the wireless terminal and an E-UTRAN, where the E-UTRAN is a base station subsystem of a 4G network, and specifically, may be an evolved NodeB (eNodeB).

An RRC layer processes layer-3 information of a control plane between the wireless terminal and the E-UTRAN. Layer 1 of the control plane between the wireless terminal and the E-UTRAN is a physical layer, layer 2 is a Medium Access Control (MAC) layer, and the RRC layer is layer 3. The RRC allocates radio resources and sends related signaling. A main part of control signaling between the wireless terminal and the E-UTRAN is an RRC message, where the RRC message carries all parameters required for creating, modifying, and releasing layer-2 and layer-1 protocol entities and also carries some signaling of a non-access stratum (NAS).

The first message is used to query a radio access capability of the wireless terminal. The first message in this embodiment of the present disclosure is at least used to query the second RAT capability of the wireless terminal, and may also be used to query a first RAT capability of the wireless terminal or multiple other RAT capabilities. For example, the first message may be a capability enquiry message (UECapabilityEnquiry message) sent by the E-UTRAN to the wireless terminal, where the message may be used to query capabilities of the wireless terminal. Specifically, the message may carry E-UTRA, UTRA, GERAN-CS, and GERAN-PS, which are used to query an E-UTRA capability, a UTRA capability, a GERAN-CS capability, and a GERAN-PS capability of a wireless terminal respectively. In this embodiment, the capability enquiry message carries at least the E-UTRA, which is used to query a 4G capability of the wireless terminal, that is, the E-UTRA capability.

It should be noted that after the wireless terminal establishes the connection with the second RAT network, the second RAT network may send the first message to the wireless terminal under multiple triggering conditions. For example: 1. when the wireless terminal performs an attach procedure, that is, when the wireless terminal is powered on and accesses the second RAT network, the second RAT network may send the first message to the wireless terminal; 2. when the wireless terminal is changed from a first RAT network to the second RAT network for the first time to perform a tracking area update (TAU), the second RAT network may send the first message to the wireless terminal; 3. when a capability of the wireless terminal changes, the wireless terminal sends, to a network entity (for example, a mobility management entity, MME), a TAU message carrying a capability change of the wireless terminal, and the network entity instructs, according to the TAU message, the second RAT network to send the first message to the wireless terminal; and 4. when capability information of the wireless terminal stored in the network entity (for example, the MME) is incorrect or is deleted, the network entity may instruct the second RAT network, and then the second RAT network may send the first message to the wireless terminal. Herein, a method for instructing, by the network entity, the second RAT network to send the first message to the wireless terminal is specifically as follows. When the network entity sends an S1 initial context setup request message to the wireless terminal, the capability information of the wireless terminal is not included, and the second RAT network learns, according to the S1 initial context setup request message that does not include the capability information of the wireless terminal, that the first message needs to be sent to the wireless terminal.

Step 102: The wireless terminal sends a second message to the second RAT network, where the second message is used to indicate the second RAT capability of the wireless terminal and indicate that the wireless terminal does not support the first RAT.

After receiving the first message sent by the second RAT network, the wireless terminal needs to report queried capabilities to the second RAT network. In the prior art, the wireless terminal needs to report its capabilities to the second RAT network according to facts. However, in this embodiment of the present disclosure, to avoid frequent changes of the wireless terminal between the second RAT network and the first RAT network, when the wireless terminal reports its capabilities to the second RAT network, the wireless terminal notifies the second RAT network that the wireless terminal does not support the first RAT.

Specifically, the second message may be a capability notification message (UECapabilityInformation message) sent by the wireless terminal to the second RAT network.

In the prior art, when the wireless terminal supports the first RAT, second RAT capability information reported by the wireless terminal includes information related to the first RAT.

However, in this embodiment of the present disclosure, the second message includes the second RAT capability of the wireless terminal but does not include the information related to the first RAT. In other words, the second RAT capability information reported by the wireless terminal does not include the information related to the first RAT. For example, the first RAT is GERAN, the second RAT is E-UTRA, and the second RAT capability information carried by the second message does not include the information related to the first RAT, for example, the information related to the first RAT may be frequency band information of the first RAT. Specifically, when a 4G base station queries an E-UTRA capability of a terminal using a capability enquiry message (UECapabilityEnquiry message), parameters (interRAT-Parameters) of a 4G capability (UE-EUTRA-Capability) of a content list (ue-CapabilityRAT-ContainerList) of capability information (UECapabilityInformation) that is returned by the terminal to the base station does not carry 2G (GERAN) information; and the GERAN information, for example, may be frequency band information (supportedBandListGERAN). When the second RAT network learns that the second RAT capability information of the terminal does not include the information related to the first RAT, the second RAT network may learn that the wireless terminal does not support the first RAT.

In another implementation manner, in addition to the second RAT capability of the wireless terminal, the second message may further include an identifier that is used to indicate that the wireless terminal does not support the first RAT. When the second RAT network acquires the identifier, the second RAT network may learn that the wireless terminal does not support the first RAT.

In another implementation manner, in addition to the content that is used to query the second RAT capability of the wireless terminal, the first message may further include content that is used to query a packet switched (PS) domain capability of the first RAT of the wireless terminal, or may further include content that is used to query the first RAT capability of the wireless terminal. When the first message includes both the content that is used to query the PS domain capability of the first RAT of the wireless terminal and the content that is used to query the second RAT capability of the wireless terminal, the second message does not include the frequency band information of the first RAT and information about the PS domain capability of the first RAT. In other words, the second message sent by the wireless terminal to the second RAT network does not include the information related to the first RAT, where the information related to the first RAT may be the frequency band information of the first RAT and the information about the PS domain capability of the first RAT. When the first message includes both the content that is used to query the first RAT capability of the wireless terminal and the content that is used to query the second RAT capability of the wireless terminal, the second message does not include the frequency band information of the first RAT and information about the first RAT capability. In other words, the second message sent by the wireless terminal to the second RAT network does not include the information related to the first RAT, where the information related to the first RAT may be the frequency band information of the first RAT and the information about the first RAT capability.

In the prior art, when the wireless terminal supports the first RAT, and when the second RAT network queries the wireless terminal for the first RAT capability or the PS domain capability of the first RAT, a message reported by the wireless terminal includes the first RAT capability or the PS domain capability of the first RAT. However, in this embodiment, when the second RAT network queries the wireless terminal for the first RAT capability or the PS domain capability of the first RAT, a message reported by the wireless terminal does not include the first RAT capability or the PS domain capability of the first RAT. For example, the first RAT is GERAN, the second RAT is E-UTRA, and the second message does not carry the PS domain capability of the first RAT, where the PS domain capability of the first RAT may include the following content: rat-Type=GERAN-PS; access types supported by the wireless terminal: GSM900-P, GSM 900-E, GSM 900-R, GSM 1800, GSM 1900, and the like; and a radio frequency power capability, a multislot capability, a handover capability, a dual bearer capability, a frequency change capability, a supported encryption algorithm, and the like.

In this embodiment of the present disclosure, although the wireless terminal supports the first RAT, the second message reported by the wireless terminal does not include the information related to the first RAT. For example, the first RAT is GERAN, and the second message does not include the foregoing information related to the first RAT. When the second RAT network receives the second message that does not include the information related to the first RAT, the second RAT network learns that the wireless terminal does not support the first RAT.

In another implementation manner, when the first message includes both the content that is used to query the first RAT capability of the wireless terminal and the content that is used to query the second RAT capability of the wireless terminal, or when the first message includes both the content that is used to query the PS domain capability of the first RAT of the wireless terminal and the content that is used to query the second RAT capability of the wireless terminal, the second message may also include an identifier that is used to indicate that the wireless terminal does not support the first RAT. When the second RAT network acquires the identifier, the second RAT network may learn that the wireless terminal does not support the first RAT.

In this embodiment of the present disclosure, after a wireless terminal that supports a first RAT and a second RAT establishes a connection with a second RAT network, the wireless terminal may receive a first message that is used to query a second RAT capability of the wireless terminal and is sent by the second RAT network; and the wireless terminal sends a second message to the second RAT network, where the second message is used to indicate the second RAT capability of the wireless terminal and indicate that the wireless terminal does not support the first RAT. Because the wireless terminal reports to the second RAT network that the wireless terminal does not support the first RAT, the second RAT network does not instruct the wireless terminal to be changed to the first RAT, so that the wireless terminal can work in the second RAT network for a long time, the number of changes of the wireless terminal between the first RAT and the second RAT is reduced, network load is reduced, and user experience is enhanced.

It should be noted that the change described in the embodiments of the present disclosure includes redirection and handover processes of the wireless terminal in a connection state, and a cell reselection process of the wireless terminal in a non-connection state (that is, an idle state).

FIG. 2 is a schematic flowchart of a wireless communication method according to a second embodiment of the present disclosure. As shown in FIG. 2, the method includes the following steps:

Step 201: After a wireless terminal that supports a first RAT and a second RAT establishes a connection with a second RAT network, the wireless terminal receives a first message sent by the second RAT network, where the first message includes content that is used to query a second RAT capability of the wireless terminal.

This step is the same as step 101 in the embodiment shown in FIG. 1.

Step 202: The wireless terminal determines a mode of the wireless terminal. If the wireless terminal is in a dual-standby mode, step 203 is performed; and if the wireless terminal is in a circuit switched fallback mode, step 204 is performed.

It should be noted that the wireless terminal may determine the mode of the wireless terminal after step 201, or may also determine the mode of the wireless terminal before receiving the first message. This embodiment of the present disclosure does not limit when the wireless terminal determines the mode of the wireless terminal.

The wireless terminal generally supports two modes: a dual-standby mode and a circuit switched fallback (CSFB) mode. Dual-standby is as follows. The wireless terminal has two radio frequency modules, which can send and receive data simultaneously in two networks, for example, the wireless terminal may simultaneously work in a 2G/3G CS network and a 4G network. Specifically, the dual-standby mode may be a simultaneous GSM and LTE (SGLTE) mode or may be a simultaneous Voice and LTE (SVLTE) mode.

Specifically, a method for determining, by the wireless terminal, the mode of the wireless terminal may be as follows. The wireless terminal determines whether a public land mobile network identifier (PLMN ID) of a second RAT cell on which the wireless terminal camps is in an operator controlled PLMN (OPLMN) selector list that is stored by the wireless terminal; and if the PLMN ID is in the OPLMN, determines that the wireless terminal is in the dual-standby mode, and if the PLMN ID is not in the OPLMN, determines that the wireless terminal is in the circuit switched fallback mode.

Step 203: The wireless terminal sends a second message to the second RAT network.

The second message sent by the wireless terminal to the second RAT network in this step is the same as the second message in the embodiment shown in FIG. 1. For details, refer to the description in step 102 in the embodiment shown in FIG. 1.

Compared with the embodiment shown in FIG. 1, in this embodiment, the wireless terminal first determines the mode of the wireless terminal before sending the second message, and sends the second message only when the wireless terminal is in the dual-standby mode.

Step 204: The wireless terminal sends a third message to the second RAT network, where the third message is used to indicate the second RAT capability of the wireless terminal and indicate that the wireless terminal supports the first RAT.

A working principle of the circuit switched fallback mode is as follows. A wireless radio frequency module of the wireless terminal works in a multimode single-standby mode, that is, only a master radio frequency module works and the master radio frequency module provides a PS domain service and a CS domain service. The wireless terminal works in the 4G network when no CS domain service (for example, a voice call) is required; and falls back to the 2G/3G network when a CS domain service is required, and uses the 2G/3G CS network to implement the CS domain service. After the CS domain service ends, the wireless terminal returns to the 4G network. When the wireless terminal falls back from the 4G network to the 2G/3G network, the fallback is implemented by an E-UTRAN of the 4G network using a redirect or handover message. Therefore, if the wireless terminal is in the circuit switched fallback mode, the second RAT network needs to correctly learn capabilities of the wireless terminal, and thereby may be redirected or changed from the 4G network to the 2G/3G network when a user has a CS domain service requirement, and implement the CS domain service. Otherwise, if the second RAT network cannot correctly learn the capabilities of the wireless terminal, the wireless terminal cannot be redirected or changed to the 2G/3G network, and the CS domain service cannot be completed. Therefore, in this case, the wireless terminal needs to report the capabilities to the second RAT network according to facts. When the wireless terminal supports the first RAT, the third message sent by the wireless terminal to the second RAT network needs to indicate that the wireless terminal supports the first RAT, that is, the third message includes information related to the first RAT.

In an implementation manner, when the first message includes the content that is used to query the second RAT capability of the wireless terminal, the third message includes frequency band information of the first RAT; and in another implementation manner, when the first message includes content that is used to query a first RAT capability of the wireless terminal and the content that is used to query the second RAT capability of the wireless terminal, the third message may include the frequency band information of the first RAT and information about the first RAT capability. Specifically, for the information related to the first RAT, refer to the description in the embodiment shown in FIG. 1.

In another implementation manner, the third message may further include an identifier that is used to indicate that the wireless terminal supports the first RAT.

It should be noted that this embodiment of the present disclosure may further include the following step. After the wireless terminal establishes the connection with the second RAT network, skipping detecting, by the wireless terminal, a signal strength corresponding to the first RAT.

After the wireless terminal has reported capability information to the second RAT network, the second RAT network may subsequently request the wireless terminal to report a signal strength corresponding to a network supported by the wireless terminal. For example, if the wireless terminal reports to the second RAT network that the wireless terminal supports the second RAT, the second RAT network may request the wireless terminal to report a signal strength that corresponds to the second RAT and is detected by the wireless terminal. Because the wireless terminal reports to the second RAT network that the wireless terminal does not support the first RAT, when the second RAT network subsequently requests the wireless terminal to report signal strengths of other RATs except the second RAT, the wireless terminal may not report the signal strength of the first RAT. Therefore, to reduce power consumption, the wireless terminal may not detect the signal strength corresponding to the first RAT.

In another implementation manner, after determining that the wireless terminal is in the dual-standby mode, the wireless terminal may no longer detect the signal strength corresponding to the first RAT.

Compared with the embodiment shown in FIG. 1, in this embodiment of the present disclosure, a wireless terminal sends a second message to a second RAT network only when determining that the wireless terminal is in a dual-standby mode, where the second message is used to indicate that the wireless terminal does not support a first RAT. Because the wireless terminal reports to the second RAT network that the wireless terminal does not support the first RAT, the second RAT network does not instruct the wireless terminal to be changed to the first RAT. Therefore, the wireless terminal can work in the second RAT network for a long time, the number of changes of the wireless terminal between the first RAT and the second RAT is reduced, network load is reduced, and user experience is enhanced.

Figure 3:
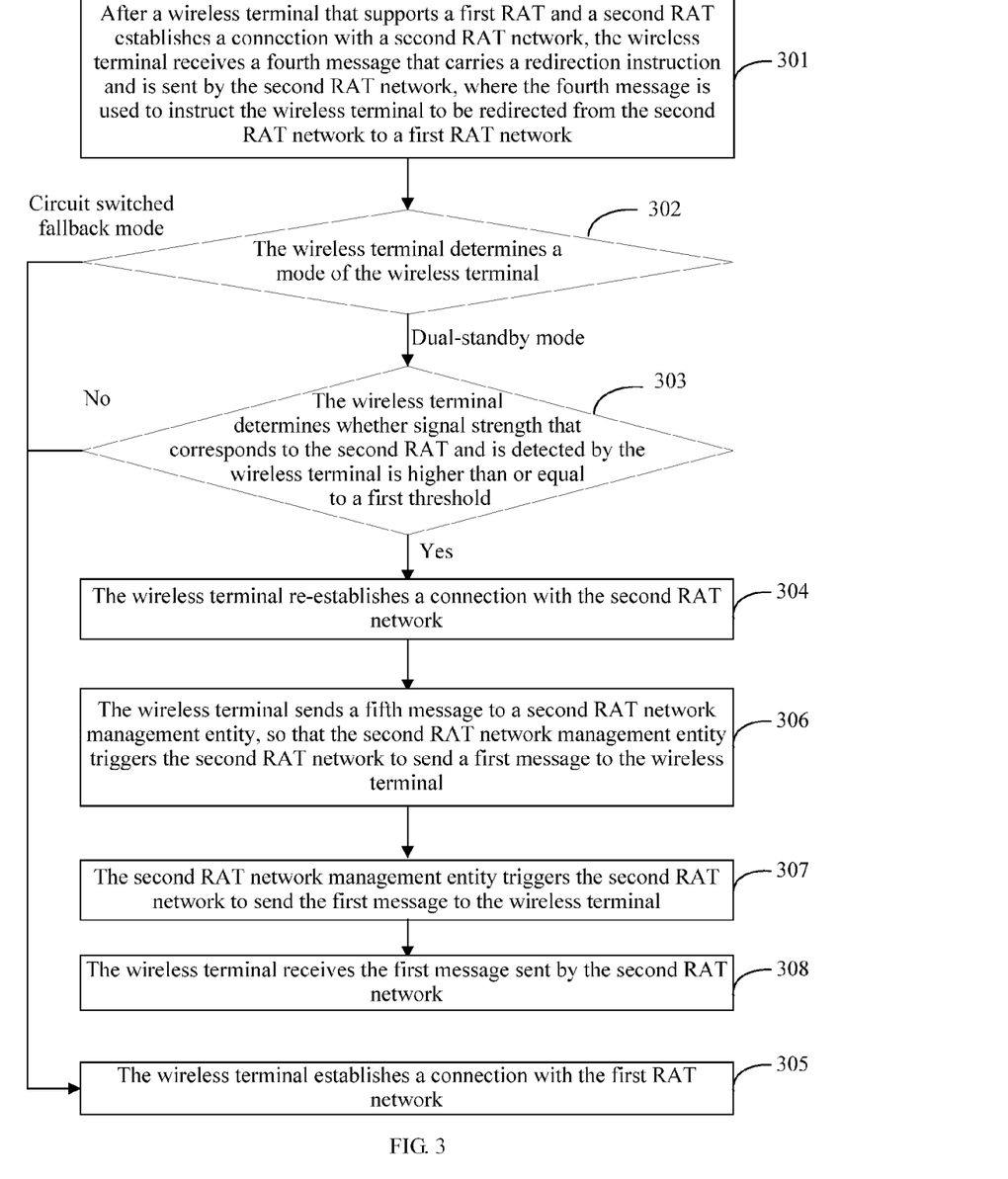
FIG. 3 is a schematic flowchart of a wireless communication method according to a third embodiment of the present disclosure.

FIG. 3 is a schematic flowchart of a wireless communication method according to a third embodiment of the present disclosure. As shown in FIG. 3, the method includes the following steps:

Step 301: After a wireless terminal that supports a first RAT and a second RAT establishes a connection with a second RAT network, the wireless terminal receives a fourth message that carries a redirection (redirect) instruction and is sent by the second RAT network, where the fourth message is used to instruct the wireless terminal to be redirected from the second RAT network to a first RAT network.

It should be noted that in this embodiment, the first RAT, for example, may be 2G that is, a GERAN; or the first RAT, for example, may be 3G, that is, UTRA; or the first RAT, for example, may be 2G and 3G.

After the wireless terminal establishes the connection with the second RAT network, wireless communication may be performed between the wireless terminal and the second RAT network. After the wireless terminal establishes the connection with the second RAT network, when the second RAT network queries capabilities of the wireless terminal, the wireless terminal may report to the second RAT network that the wireless terminal supports the first RAT and the second RAT. In a process in which the wireless terminal and the second RAT network perform wireless communication, the second RAT network may request the wireless terminal to report a measurement report of each network, where the measurement report may include a signal strength, of each network, detected by the wireless terminal, for example, a signal strength of the first RAT and a signal strength of the second RAT. When the second RAT network learns, according to the measurement report reported by the wireless terminal, that the signal strength of the second RAT is poor, the second RAT network may instruct the wireless terminal to be redirected to the first RAT network.

When the second RAT network instructs the wireless terminal to be redirected to the first RAT network, the wireless terminal receives the fourth message that is sent by the second RAT network and carries the redirect indication. When the second RAT is E-UTRA, the fourth message may be an RRC connection release message (RRCConnectionRelease) that carries the redirect indication.

Step 302: The wireless terminal determines a mode of the wireless terminal. If the wireless terminal is in a dual-standby mode, step 303 is performed; and if the wireless terminal is in a circuit switched fallback mode, step 305 is performed.

For details about a process in which the wireless terminal determines the mode of the wireless terminal, refer to the description in step 202 in the embodiment shown in FIG. 2.

Step 303: The wireless terminal determines whether a signal strength that corresponds to the second RAT and is detected by the wireless terminal is higher than or equal to a first threshold. When the signal strength that corresponds to the second RAT and is detected by the wireless terminal is higher than or equal to the first threshold, step 304 is performed; otherwise, step 305 is performed.

After the wireless terminal receives the fourth message and determines that the wireless terminal is in the dual-standby mode, the wireless terminal may determine whether a current signal strength corresponding to the second RAT is weak. When the signal strength corresponding to the second RAT is higher than or equal to the first threshold, it indicates that the current signal strength corresponding to the second RAT is not weak. In this case, the wireless terminal may choose to continue to camp on the second RAT network but is not redirected to the first RAT network. When the signal strength corresponding to the second RAT is lower than the first threshold, it indicates that the current signal strength corresponding to the second RAT is weak. In this case, the wireless terminal may choose to be redirected to the first RAT network. The first threshold may be a preset fixed value, or may be dynamically adjusted according to an actual condition.

It should be noted that in another implementation manner, step 303 may be omitted, and step 304 is directly performed when it is determined that the wireless terminal is in the dual-standby mode in step 302. Alternatively, in another implementation manner, steps 302, 303, and 305 may also be omitted, and step 304 is directly performed after step 301.

Step 304: The wireless terminal re-establishes a connection with the second RAT network.

After the wireless terminal re-establishes the connection with the second RAT network, the wireless terminal camps on the second RAT network.

Step 305: The wireless terminal establishes a connection with the first RAT network.

When the wireless terminal is in the circuit switched fallback mode, or when the signal strength of the second RAT network is very weak, the wireless terminal makes a reselection to the first RAT network according to the fourth message, and initiates a location update request, so as to complete a process of redirecting the wireless terminal to the first RAT network.

Further, in another implementation manner, this embodiment may further include the following steps after step 304.

Step 306: The wireless terminal sends a fifth message to a second RAT network management entity, so that the second RAT network management entity triggers the second RAT network to send a first message to the wireless terminal.

After the wireless terminal re-establishes the connection with the second RAT network, the wireless terminal may send the fifth message to the second RAT network management entity. The second RAT network management entity may be, for example, a mobility management entity (MME). The fifth message is used to notify the MME that a capability of the wireless terminal changes. For example, the fifth message may be specifically a tracking area update (TAU) message that carries "UE radio capability information update needed=1".

Step 307: The second RAT network management entity triggers the second RAT network to send the first message to the wireless terminal.

After receiving the fifth message, the MME sends a notification message to the second RAT network, where the notification message is used to notify the second RAT network that the capability of the wireless terminal changes; and then the second RAT network sends the first message to the wireless terminal, where the first message is used to query capabilities of the wireless terminal. For example, the MME triggers, using an initial context setup message that does not carry wireless terminal Radio Capability information, the second RAT network to send the first message to the wireless terminal.

Step 308: The wireless terminal receives the first message sent by the second RAT network.

For the first message, refer to the description in step 101 in the embodiment shown in FIG. 1.

After step 308, this embodiment may further include step 102 in the embodiment shown in FIG. 1. Alternatively, after step 308, this embodiment may further include step 202 to step 204 in the embodiment shown in FIG. 2.

In other words, the wireless terminal may send a second message to the second RAT network, where the second message is used to indicate that the wireless terminal does not support the first RAT, so that the second RAT network no longer sends, to the wireless terminal, the fourth message that is used for redirection.

In this embodiment of the present disclosure, after a wireless terminal establishes a connection with a second RAT network, when the wireless terminal receives a fourth message that is used to instruct the wireless terminal to be redirected to a first RAT network and is sent by the second RAT network, and when the wireless terminal determines that a signal strength of the second RAT network is higher than or equal to a preset value, redirection to the first RAT network is not performed but a connection is re-established with the second RAT network to continue to camp on the second RAT network. Moreover, after the wireless terminal re-establishes the connection with the second RAT network, the wireless terminal may trigger, using a second RAT network management entity, the second RAT network to deliver a first message; and when making a reply according to the first message, the wireless terminal may send, to the second RAT network, a second message that is used to indicate that the wireless terminal does not support a first RAT, so that the second RAT network no longer sends, to the wireless terminal, a message that is used for redirection. In this way, the wireless terminal can work in a second RAT for a long time, the number of changes of the wireless terminal between the first RAT and the second RAT is reduced, network load is reduced, and user experience is enhanced.

Figure 4:
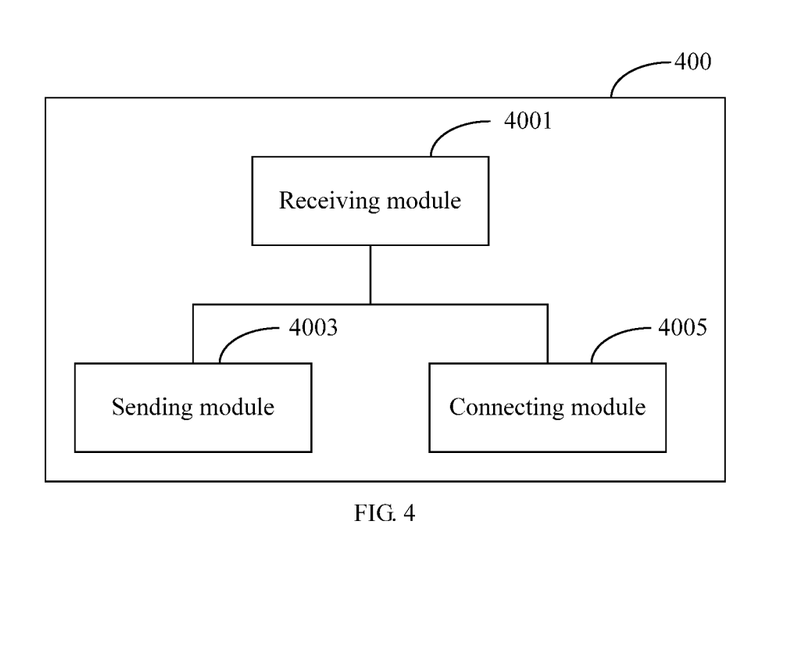
FIG. 4 is a schematic diagram of a wireless terminal according to a fourth embodiment of the present disclosure.

FIG. 4 is a schematic diagram of a wireless terminal 400 according to a fourth embodiment of the present disclosure. The wireless terminal 400 supports a first RAT and a second RAT. As shown in FIG. 4, the wireless terminal 400 includes a receiving module 4001 and a sending module 4003.

The receiving module 4001 is configured to receive a first message sent by the second RAT network after the wireless terminal establishes a connection with a second RAT network, where the first message includes content that is used to query a second RAT capability of the wireless terminal.

The sending module 4003 is configured to send a second message to the second RAT network after the receiving module 4001 receives the first message, where the second message is used to indicate the second RAT capability of the wireless terminal and indicate that the wireless terminal does not support the first RAT.

Further, the sending module 4003 is specifically configured to send the second message to the second RAT network when the wireless terminal is in a dual-standby mode. Alternatively, the sending module 4003 is specifically configured to send the second message to the second RAT network when the wireless terminal is in a dual-standby mode; and send a third message to the second RAT network when the wireless terminal is in a circuit switched fallback mode, where the third message is used to indicate the second RAT capability of the wireless terminal and indicate that the wireless terminal supports the first RAT.

Further, when the wireless terminal is in the dual-standby mode, the sending module 4003 sends the second message to the second RAT network. Specifically, the sending module 4003 may be configured to send the second message to the second RAT network when a PLMN identifier of a second RAT cell on which the wireless terminal camps is in an operator controlled PLMN selector list that is stored by the wireless terminal.

Further, the wireless terminal 400 further includes a connecting module 4005 configured to re-establish a connection with the second RAT network before the receiving module 4001 receives the first message sent by the second RAT network and after the receiving module 4001 receives a fourth message that is sent by the second RAT network and carries a redirect indication, where the fourth message is used to instruct the wireless terminal to be redirected from the second RAT network to the first RAT network.

Further, the sending module 4003 is further configured to send a fifth message to a second RAT network management entity after the connecting module 4005 re-establishes the connection with the second RAT network, so that the second RAT network management entity triggers the second RAT network to send the first message to the wireless terminal.

Further, the connecting module 4005 is specifically configured to re-establish the connection with the second RAT network before the receiving module 4001 receives the first message sent by the second RAT network, after the receiving module 4001 receives the fourth message that is sent by the second RAT network and carries the redirect indication, and when a signal strength that corresponds to the second RAT and is detected by the wireless terminal is higher than or equal to a first threshold.

The wireless terminal shown in the embodiment is configured to implement the method in the embodiment shown in FIG. 1, FIG. 2, or FIG. 3 described above. For details about a working process and principle of the wireless terminal, and an achieved effect, refer to the embodiment shown in FIG. 1, FIG. 2, or FIG. 3.

Figure 5:
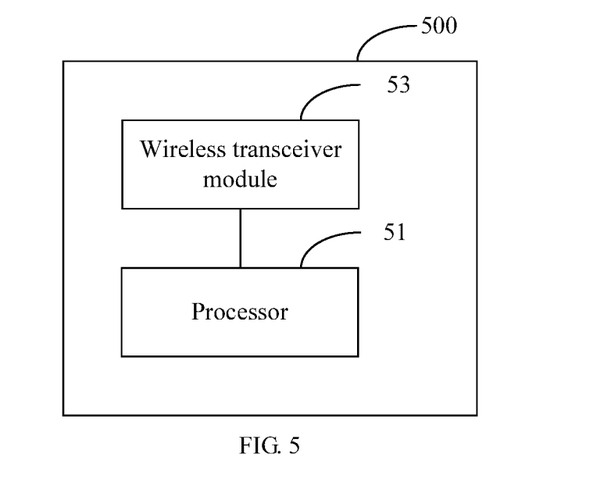
FIG. 5 is a schematic diagram of a wireless terminal according to a fifth embodiment of the present disclosure.

Another embodiment of the present disclosure further provides a wireless terminal 500, which is configured to implement the method in the embodiment shown in FIG. 1, FIG. 2, or FIG. 3 described above. For details about a working process and principle of the wireless terminal, and an achieved effect, refer to the embodiment shown in FIG. 1, FIG. 2, or FIG. 3. As shown in FIG. 5, FIG. 5 is a schematic diagram of a wireless terminal according to a fifth embodiment of the present disclosure. The wireless terminal 500 includes a processor 51 and a wireless transceiver module 53.

The wireless transceiver module 53 is configured to perform wireless communication externally.

The processor 51 is configured to receive, using the wireless transceiver module 53, a first message sent by the second RAT network after the wireless terminal establishes a connection with a second RAT network, where the first message includes content that is used to query a second RAT capability of the wireless terminal.

The processor 51 is further configured to, after the first message is received, send a second message to the second RAT network using the wireless transceiver module 53, where the second message is used to indicate the second RAT capability of the wireless terminal and indicate that the wireless terminal does not support a first RAT. Further, when sending the second message to the second RAT network using the wireless transceiver module 53, the processor 51 is specifically configured to send the second message to the second RAT network using the wireless transceiver module 53 when the wireless terminal is in a dual-standby mode. Alternatively, when sending the second message to the second RAT network using the wireless transceiver module 53, the processor 51 is specifically configured to send the second message to the second RAT network using the wireless transceiver module 53 when the wireless terminal is in a dual-standby mode; and send a third message to the second RAT network using the wireless transceiver module 53 when the wireless terminal is in a circuit switched fallback mode, where the third message is used to indicate the second RAT capability of the wireless terminal and indicate that the wireless terminal supports the first RAT. Alternatively, when sending the second message to the second RAT network using the wireless transceiver module 53, the processor 51 is specifically configured to send the second message to the second RAT network using the wireless transceiver module 53 when a PLMN identifier of a second RAT cell on which the wireless terminal camps is in an operator controlled PLMN selector list that is stored by the wireless terminal.

Further, the processor 51 is further configured to re-establish a connection with the second RAT network using the wireless transceiver module 53 before receiving the first message sent by the second RAT network and after receiving a fourth message that is sent by the second RAT network and carries a redirect indication, where the fourth message is used to instruct the wireless terminal to be redirected from the second RAT network to the first RAT network.

Further, the processor 51 is further configured to send a fifth message to a second RAT network management entity using the wireless transceiver module 53 after re-establishing the connection with the second RAT network, so that the second RAT network management entity triggers the second RAT network to send the first message to the wireless terminal.

Further, when re-establishing the connection with the second RAT network using the wireless transceiver module 53, the processor 51 is specifically configured to re-establish the connection with the second RAT network using the wireless transceiver module 53 before receiving the first message sent by the second RAT network and after receiving the fourth message that is sent by the second RAT network and carries the redirect indication, and when a signal strength that corresponds to a second RAT and is detected by the wireless terminal is higher than or equal to a first threshold.

In the wireless terminal provided in the embodiments of the present disclosure, the wireless transceiver module, for example, may be a wireless transceiver (for example, a radio frequency circuit) in the wireless terminal, and the processor, for example, may include a wireless communications component in the wireless terminal. The wireless communications component may include a modem chip, or may include a Modem chip and a central processing unit (CPU), or includes a Modem chip and a digital signal processor (DSP), or includes a Modem chip and an application processor (AP) chip. That a mobile terminal is a mobile phone is used as an example for description. The mobile phone may include parts such as a radio frequency (RF) circuit, a memory, an input unit, a display unit, a gravity sensor, an audio circuit, a processor, and a power supply. A person skilled in the art may understand that a structure of the mobile phone does not constitute a limitation to the mobile phone. The mobile phone may include more or less parts, or may include some combination parts.

It should be noted that the method provided in any one of the foregoing embodiments of the present disclosure may be performed by the wireless terminal, or may also be performed by a wireless communications component in the wireless terminal. The wireless communications component may include a circuit or an integrated circuit (IC). For example, the wireless communications component may include a single packaged IC, or may also include multiple packaged ICs that have a same function or different functions. For example, the wireless communications component may include a Modem chip, or may also include a Modem chip and a CPU, or include a Modem chip and a DSP, or include a Modem chip and an AP chip.

Figure 6:
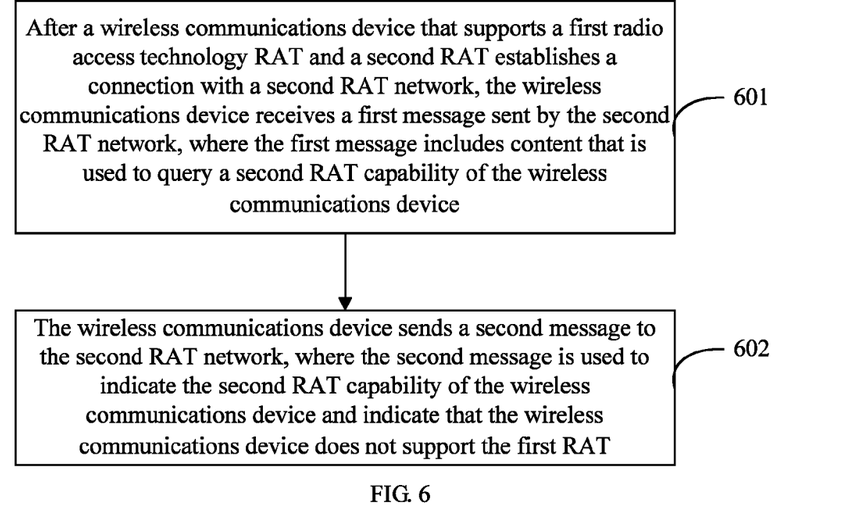
FIG. 6 is a schematic flowchart of a wireless communication method according to a sixth embodiment of the present disclosure.

FIG. 6 is a schematic flowchart of a wireless communication method according to a sixth embodiment of the present disclosure. As shown in FIG. 6, the method may include the following steps:

Step 601: After a wireless communications component that supports a first radio access technology RAT and a second RAT establishes a connection with a second RAT network, the wireless communications component receives a first message sent by the second RAT network, where the first message includes content that is used to query a second RAT capability of the wireless communications component.

Step 602: The wireless communications component sends a second message to the second RAT network, where the second message is used to indicate the second RAT capability of the wireless communications component and indicate that the wireless communications component does not support the first RAT.

Optionally, in another implementation manner, the wireless communications component may first determine a mode in which the wireless communications component is before sending the second message to the second RAT network. When the wireless communications component is in a dual-standby mode, the wireless communications component sends the second message to the second RAT network.

Optionally, it may be determined, using the following manner, whether the wireless communications component is in the dual-standby mode. When a PLMN identifier of a second RAT cell on which the wireless communications component camps is in an operator controlled PLMN selector list that is stored by the wireless communications component, it indicates that the wireless communications component is in the dual-standby mode.

Specifically, the second message may include the second RAT capability of the wireless communications component but does not include information related to the first RAT; or the second message may include the second RAT capability of the wireless communications component and include an identifier that is used to indicate that the wireless communications component does not support the first RAT. The information related to the first RAT may be frequency band information of the first RAT.

In another implementation manner, in addition to the content that is used to query the second RAT capability of the wireless communications component, the first message further includes content that is used to query a packet switched domain capability of the first RAT of the wireless communications component, or further includes content that is used to query a first RAT capability of the wireless communications component. In this implementation manner, the second message may include the second RAT capability of the wireless communications component but does not include the information related to the first RAT; or the second message may include the second RAT capability of the wireless communications component and include an identifier that is used to indicate that the wireless communications component does not support the first RAT.

Moreover, when the first message further includes content that is used to query the packet switched domain capability of the first RAT of the wireless communications component, the information related to the first RAT is the frequency band information of the first RAT and information about the packet switched domain capability of the first RAT. In other words, the second RAT network queries the second RAT capability of the wireless communications component and the packet switched domain capability of the first RAT of the wireless communications component using the first message; and the second message returned by the wireless communications component to the second RAT network may not include the frequency band information of the first RAT and the information about the packet switched domain capability of the first RAT.

When the first message further includes the content that is used to query the first RAT capability of the wireless communications component, the information related to the first RAT is the frequency band information of the first RAT and information about the first RAT capability.

Further, the connection established by the wireless communications component with the second RAT network may be an RRC connection.

A difference between the method provided in this embodiment of the present disclosure and the methods provided in the embodiments shown in FIG. 1 to FIG. 3 mainly lies in that execution bodies are different. In this embodiment, only some main steps are described. For a detailed method process, refer to the descriptions in the embodiments shown in FIG. 1 to FIG. 3.

In this embodiment of the present disclosure, after a wireless communications component that supports a first RAT and a second RAT establishes a connection with a second RAT network, the wireless communications component may receive a first message that is used to query a second RAT capability of the wireless communications component and is sent by the second RAT network; and the wireless communications component sends a second message to the second RAT network, where the second message is used to indicate the second RAT capability of the wireless communications component and indicate that the wireless communications component does not support the first RAT. Because the wireless communications component reports to the second RAT network that the wireless communications component does not support the first RAT, the second RAT network does not instruct a wireless terminal in which the wireless communications component is located to be changed to the first RAT, so that the wireless terminal in which the wireless communications component is located can work in the second RAT network for a long time, the number of changes of the wireless terminal between the first RAT and the second RAT is reduced, network load is reduced, and user experience is enhanced.

Figure 7:
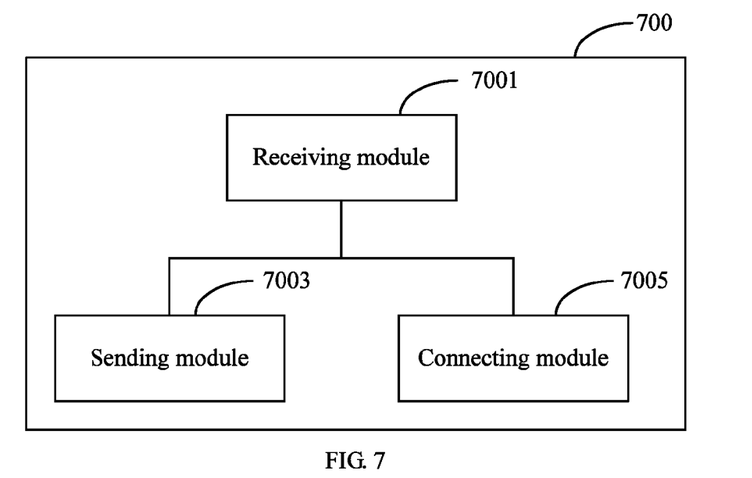
FIG. 7 is a schematic diagram of a wireless communications component according to a seventh embodiment of the present disclosure.

FIG. 7 is a schematic diagram of a wireless communications component 700 according to a seventh embodiment of the present disclosure. The wireless communications component 700 supports a first RAT and a second RAT. As shown in FIG. 7, the wireless communications component 700 includes a receiving module 7001 and a sending module 7003.

The receiving module 7001 is configured to receive a first message sent by the second RAT network after the wireless communications component establishes a connection with a second RAT network, where the first message includes content that is used to query a second RAT capability of the wireless communications component.

The sending module 7003 is configured to send a second message to the second RAT network after the receiving module 7001 receives the first message, where the second message is used to indicate the second RAT capability of the wireless communications component and indicate that the wireless communications component does not support the first RAT.

Further, the sending module 7003 is specifically configured to send the second message to the second RAT network when the wireless communications component is in a dual-standby mode. Alternatively, the sending module 7003 is specifically configured to send the second message to the second RAT network when the wireless communications component is in a dual-standby mode; and send a third message to the second RAT network when the wireless communications component is in a circuit switched fallback mode, where the third message is used to indicate the second RAT capability of the wireless communications component and indicate that the wireless communications component supports the first RAT.

Further, when the wireless communications component is in the dual-standby mode, the sending module 7003 sends the second message to the second RAT network. Specifically, the sending module 7003 may be configured to send the second message to the second RAT network when a PLMN identifier of a second RAT cell on which the wireless communications component camps is in an operator controlled PLMN selector list that is stored by the wireless communications component.

Further, the wireless communications component 700 further includes a connecting module 7005 configured to re-establish a connection with the second RAT network before the receiving module 7001 receives the first message sent by the second RAT network and after the receiving module 7001 receives a fourth message that is sent by the second RAT network and carries a redirect indication, where the fourth message is used to instruct the wireless communications component to be redirected from the second RAT network to the first RAT network.

Further, the sending module 7003 is further configured to send a fifth message to a second RAT network management entity after the connecting module 7005 re-establishes the connection with the second RAT network, so that the second RAT network management entity triggers the second RAT network to send the first message to the wireless communications component.

Further, the connecting module 7005 is specifically configured to re-establish the connection with the second RAT network before the receiving module 7001 receives the first message sent by the second RAT network, after the receiving module 7001 receives the fourth message that is sent by the second RAT network and carries the redirect indication, and when a signal strength that corresponds to the second RAT and is detected by the wireless communications component is higher than or equal to a first threshold.

The wireless communications component shown in this embodiment is configured to implement the method in the embodiment shown in FIG. 6. For details about a working process and principle of the wireless communications component, and an achieved effect, refer to the embodiment shown in FIG. 6.

It should be noted that in an optional specific implementation manner, the wireless communications component provided in the embodiment shown in FIG. 7 may include the processor 51 in the wireless terminal provided in the embodiment shown in FIG. 5, or may be a part of the processor 51.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A wireless communication method, comprising:
receiving, by a wireless communications component, a first message sent by a second radio access technology (RAT) network after the wireless communications component that supports a first RAT and a second RAT establishes a connection with the second RAT network, wherein the first message comprises content used to query a second RAT capability of the wireless communications component; and
sending, by the wireless communications component, a second message to the second RAT network when the wireless communications component is in a dual-standby mode,
wherein the second message indicates the second RAT capability of the wireless communications component and indicates the wireless communications component does not support the first RAT,
wherein the wireless communications component in the dual-standby mode is able to simultaneously work in a first RAT network and the second RAT network,
wherein the first RAT comprises second generation (2G) or third generation (3G),
wherein the second RAT is fourth generation (4G), and
wherein the connection established by the wireless communications component with the second RAT network is a radio resource control (RRC) connection.

2. The method according to claim 1, wherein sending, by the wireless communications component, the second message to the second RAT network when the wireless communications component is in the dual-standby mode comprises sending, by the wireless communications component, the second message to the second RAT network when a public land mobile network (PLMN) identifier of a second RAT cell on which the wireless terminal camps is in an operator controlled PLMN selector list stored by the wireless communications component.

3. The method according to claim 1, wherein the second message comprises the second RAT capability of the wireless communications component, and wherein the second message is absent information related to the first RAT.

4. The method according to claim 1, wherein the second message comprises the second RAT capability of the wireless communications component and an identifier used to indicate that the wireless communications component does not support the first RAT.

5. The method according to claim 1, wherein the first message further comprises content used to query a packet switched domain capability of the first RAT of the wireless communications component.

6. The method according to claim 1, wherein the first message further comprises content used to query a first RAT capability of the wireless communications component.

7. The method according to claim 1, further comprising skipping detecting, by the wireless communications component, a signal strength corresponding to the first RAT after the wireless communications component establishes the connection with the second RAT network.

8. The method according to claim 1, wherein before receiving, by the wireless communications component, the first message sent by the second RAT network, the method further comprises:
re-establishing, by the wireless communications component, a connection with the second RAT network after the wireless communications component receives a fourth message sent by the second RAT network and carries a redirect indication, wherein the fourth message instructs the wireless communications component to be redirected from the second RAT network to a first RAT network; and
sending, by the wireless communications component, a fifth message to a second RAT network management entity, which triggers the second RAT network to send the first message to the wireless communications component.

9. The method according to claim 8, wherein re-establishing, by the wireless communications component, the connection with the second RAT network after the wireless communications component receives the fourth message sent by the second RAT network and carries the redirect indication comprises re-establishing, by the wireless communications component, the connection with the second RAT network after the wireless communications component receives the fourth message when a signal strength, detected by the wireless communications component, corresponding to the second RAT is higher than or equal to a first threshold.

10. A wireless communications component, wherein the wireless communications component supports a first radio access technology (RAT) and a second RAT, and wherein the wireless communications component comprises:
at least one processor; and
a non-transitory computer readable medium coupled to the at least one processor, wherein the processor is configured to execute one or more applications in a background, and wherein the non-transitory computer readable medium is configured to store program codes which, when executed by the processor, cause the processor to:
receive a first message sent by a second RAT network after the wireless communications component establishes a connection with the second RAT network, wherein the first message comprises content used to query a second RAT capability of the wireless communications component; and
send a second message to the second RAT network when the wireless communications component is in a dual-standby mode,
wherein the second message indicates the second RAT capability of the wireless communications component and indicates the wireless communications component does not support the first RAT,
wherein the wireless communications component in the dual-standby mode is able to simultaneously work in a first RAT network and the second RAT network,
wherein the first RAT comprises second generation (2G) or third generation (3G),
wherein the second RAT is fourth generation (4G), and
wherein the connection established by the wireless communications component with the second RAT network is a radio resource control (RRC) connection.

11. The wireless communications component according to claim 10, wherein in sending the second message to the second RAT network when the wireless communications component is in the dual-standby mode, the program codes further cause the processor to send the second message to the second RAT network when a PLMN identifier of a second RAT cell on which the wireless terminal camps is in an operator controlled PLMN selector list stored by the wireless communications component.

12. The wireless communications component according to claim 10, wherein the second message comprises the second RAT capability of the wireless communications component, and wherein the second message is absent information related to the first RAT.

13. The wireless communications component according to claim 10, wherein the second message comprises the second RAT capability of the wireless communications component and an identifier used to indicate that the wireless communications component does not support the first RAT.

14. The wireless communications component according to claim 10, wherein the first message further comprises content used to query a packet switched domain capability of the first RAT of the wireless communications component.

15. The wireless communications component according to claim 10, wherein the first message further comprises content used to query a first RAT capability of the wireless communications component.

16. The wireless communications component according to claim 10, wherein the program codes further cause the processor to skip detecting a signal strength corresponding to the first RAT after the wireless communications component establishes the connection with the second RAT network.

17. The wireless communications component according to claim 10, wherein the program codes further cause the processor to:
  re-establish a connection with the second RAT network after the wireless communications component receives a fourth message sent by the second RAT network and carrying a redirect indication before receiving the first message sent by the second RAT network, wherein the fourth message instructs the wireless communications component to be redirected from the second RAT network to a first RAT network; and
  send a fifth message to a second RAI' network management entity, which triggers the second RAT network to send the first message to the wireless communications component.

18. The wireless communications component according to claim 10, wherein in re-establishing the connection with the second RAT network after the wireless communications component receives the fourth message sent by the second RAT network and carrying the redirect indication, the program codes further cause the processor to re-establish the connection with the second RAT network after the wireless communications component receives the fourth message when a signal strength, detected by the wireless communications component, corresponding to the second RAT is higher than or equal to a first threshold.

* * * * *

UNITED STATES PATENT AND TRADEMARK OFFICE
CERTIFICATE OF CORRECTION

PATENT NO.        : 9,635,591 B2
APPLICATION NO.   : 14/984811
DATED             : April 25, 2017
INVENTOR(S)       : Hui Jin et al.

It is certified that error appears in the above-identified patent and that said Letters Patent is hereby corrected as shown below:

In the Claims

Column 16, Line 12, Claim 17 should read:
The wireless communications component according to claim 10, wherein the program codes further cause the processor to:
re-establish a connection with the second RAT network after the wireless communications component receives a fourth message sent by the second RAT network and carrying a redirect indication before receiving the first message sent by the second RAT network, wherein the fourth message instructs the wireless communications component to be redirected from the second RAT network to a first RAT network; and
send a fifth message to a second RAT network management entity, which triggers the second RAT network to send the first message to the wireless communications component.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*